United States Patent [19]

Preiss

[11] Patent Number: 5,025,878
[45] Date of Patent: Jun. 25, 1991

[54] AERODYNAMICALLY CONSTRUCTED COVER PART FOR THE UNDERSIDE OF A MOTOR VEHICLE

[75] Inventor: Michael Preiss, Vaihingen-Aurich, Fed. Rep. of Germany

[73] Assignee: Dr. Ing. h.c.F. Porsche AG, Fed. Rep. of Germany

[21] Appl. No.: 197,429

[22] Filed: May 19, 1988

[30] Foreign Application Priority Data

May 19, 1987 [DE] Fed. Rep. of Germany ....... 3716701

[51] Int. Cl.$^5$ .............................................. B60K 11/00
[52] U.S. Cl. .................................................... 180/68.1
[58] Field of Search ..................... 180/68.1, 68.2, 68.3; 123/41.56, 41.62, 41.7

[56] References Cited

FOREIGN PATENT DOCUMENTS 1286917 3/1964 Fed. Rep. of Germany .
3320987 12/1984 Fed. Rep. of Germany .
1373936 8/1964 France ............................... 180/68.1
0231816 7/1944 Switzerland ....................... 180/68.1

Primary Examiner—Andres Kashnikow
Assistant Examiner—Richard Camby
Attorney, Agent, or Firm—Evenson, Wands, Edwards, Lenahan & McKeown

[57] ABSTRACT

An aerodynamically constructed cover part for the underside of a motor vehicle, especially of a passenger motor vehicle, includes at least one inlet opening for the cooling air flowing-through between the cover part and the road surface. In order to cool effectively aggregates and/or drive unit parts located above the cover part, at least one retaining element is arranged adjacent the inlet opening for fixing the cover part, whereby the retaining element has such a shape that the cooling air entering through the inlet opening is conducted deliberately onto certain aggregates and/or drive unit parts.

18 Claims, 2 Drawing Sheets

AERODYNAMICALLY CONSTRUCTED COVER PART FOR THE UNDERSIDE OF A MOTOR VEHICLE

BACKGROUND AND SUMMARY OF THE INVENTION

The present invention relates to an aerodynamically constructed cover part for the underside of a motor vehicle, especially of a passenger motor vehicle, whereby at least one inlet opening is provided at the cover part for the cooling air flowing-through between the cover part and the road surface.

A known cover part of the aforementioned type (DE-AS 12 86 917) is secured at the floor sheet metal member disposed above the cover part without interposition of a retaining element, whereby groove-shaped indentations of the cover part extending in the vehicle longitudinal direction are supported directly at the floor sheet metal member. Furthermore, several slot-shaped openings disposed one behind the other for the ventilation of an engine space disposed thereabove are provided in the cover part.

This prior art arrangement entails the disadvantage that by reason of the indentations the cover part is constructed smooth-surfaced only area-wise and that additionally no measures have been taken between the inlet openings of the cover part and adjoining aggregates and/or drive unit parts in order to achieve a good cooling of these aggregates and/or drive unit parts.

It is the object of the present invention to undertake such measures at a cover part for the underside of a motor vehicle that with reduced air resistance of the motor vehicle, the aggregates and/or drive unit parts disposed above the cover part are adequately cooled.

The underlying problems are solved according to the present invention in that at least one retaining element for fixing the cover part is arranged at the cover part adjacent the inlet opening and is so constructed that the cooling air entering through the inlet opening is deliberately conducted onto adjoining aggregates and/or drive unit parts by means of the retaining element.

The principal advantages attained with the present invention reside in that owing to the special arrangement and construction of the retaining elements, on the one hand, a safe fastening of the covering part and, on the other, an improved cooling of the aggregates and/or drive unit parts located adjacent the inlet opening is created. The blade-shaped retaining elements can be manufactured in a simple and cost-favorable manner and can be easily installed. The transmission differential, the universal or differential joints and the axle shafts are acted upon by a defined cooling air stream owing to the funnel-shaped arrangement of the channel formed between the retaining elements. The rise of the cover part in the upward direction ahead of the inlet opening assures an effective upward guidance of the cooling air downstream of the inlet opening.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
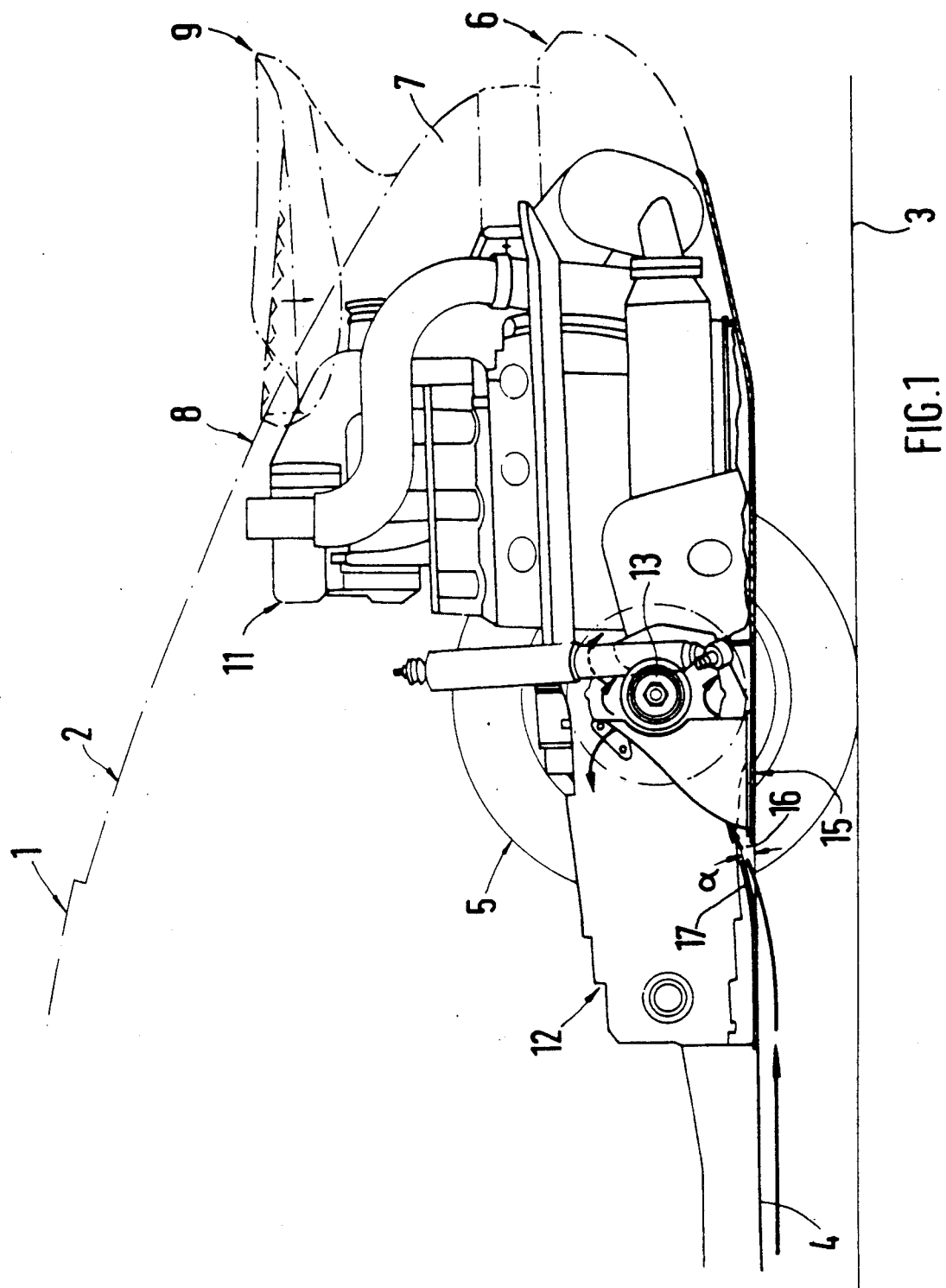
FIG. 1 is a partial side elevational view of a passenger motor vehicle with the retaining element according to the present invention, partly in cross section.

Referring now to the drawing, wherein like reference numerals are used throughout the two views to designate like parts, the rear area of a passenger motor vehicle 1 illustrated in FIG. 1 includes a body 2 whose underside extending adjacent a road surface 3 is provided with an aerodynamically constructed cover part 4. The body 2 carried by the wheels 5 is composed in the rear area of a bumper 6, of lateral parts 7 and of a pivotal lid 8, at the top side of which is arranged an air guide 9 (rear spoiler). Furthermore, an internal combustion engine 11 is arranged in the rear area to the rear of a rear axle generally designated by reference numeral 10 (FIG. 2); a transmission 12 is flangedly connected to the internal combustion engine 11. The two rear wheels of the passenger motor vehicle 1 are driven by way of universal or differential joints 13 arranged on both sides of the transmission 12 and by way of axle shafts 14 adjoining the joints 13. The cover part 4 is formed within the area of the internal combustion engine by an engine under protection.

The cover part 4 made of plastic material or light metal (aluminum) is constructed completely smooth-surfaced toward the road surface 3 and preferably covers the entire vehicle underside whereby a considerable improvement of the air resistance coefficient is achieved. The cover part 4 can thereby be constructed in one piece or of several parts. The fastening of the cover part 4 takes place preferably along the edge at the adjoining body 2 by bolts, clips or the like. Furthermore, retaining elements 15 are provided locally for fixing the cover part 4 which are connected, on the one hand, with the cover part 4 and, on the other, with body-, engine-, transmission- or drive unit-parts disposed thereabove.

In order that with a complete underfloor cover certain aggregates and/or drive units disposed above the cover part 4 receive a sufficient cooling, at least one inlet opening 16 is provided in the cover part 4, through which a portion of the cooling air guided between the road surface 3 and the cover part 4 is branched off. According to FIG. 1, the cover part 4 is provided ahead of the inlet opening 16 with a drawn-up section 17 whereby a boundary layer flow is achieved in this area by the selected small slope angle $\alpha$ of the section 17. According to the present invention, the retaining elements 15 arranged adjacent the inlet opening 16 are so constructed that the entering cooling air is deliberately conducted onto adjoining aggregates and/or drive unit parts. In the illustrated embodiment, a transmission 12 (with a transmission differential), the compensating or differential joints 13 and the axle shafts 14 are circumcirculated by the cooling air.

Figure 2:
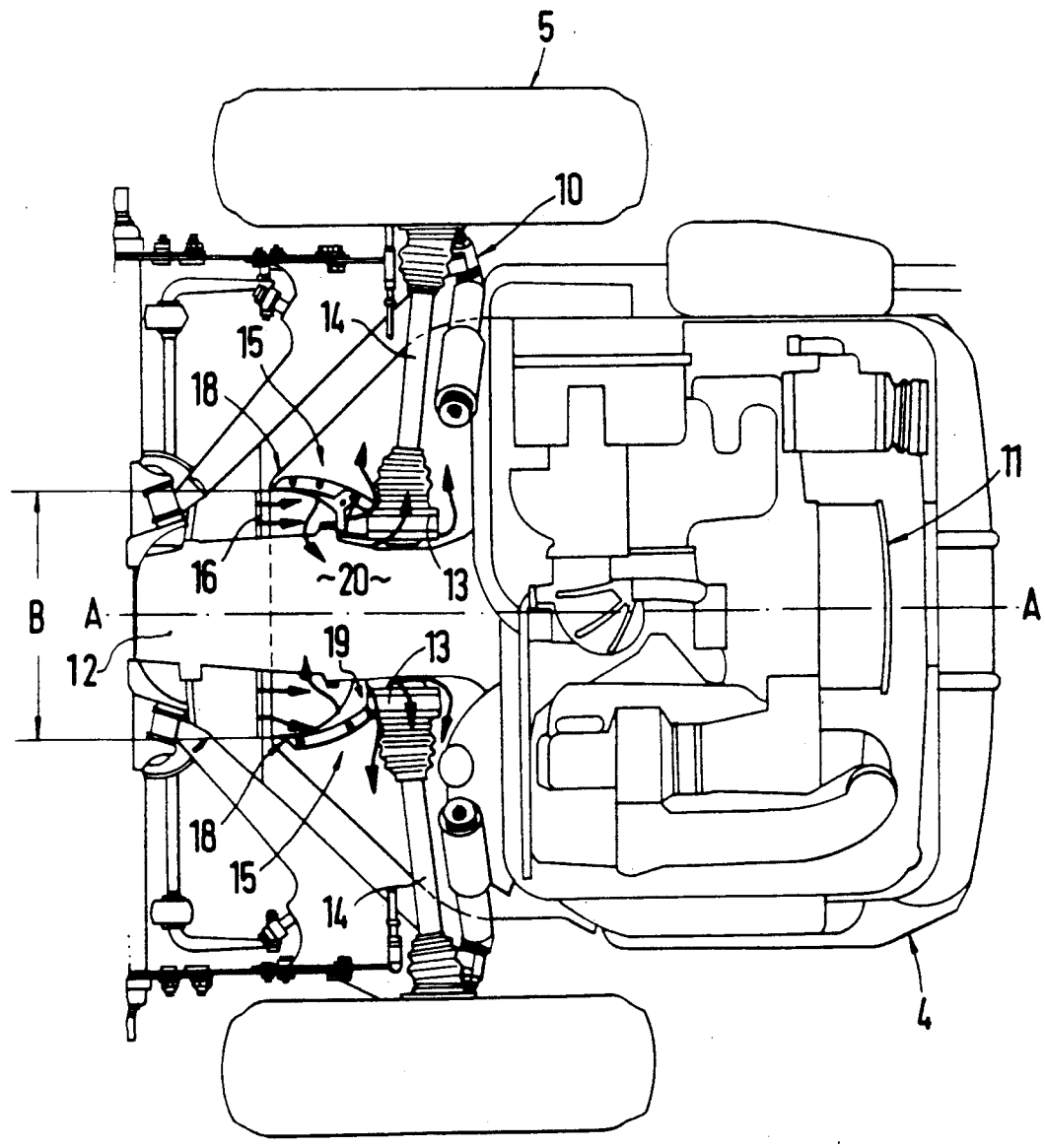
FIG. 2 is a partial plan view on the passenger motor vehicle with the retaining element for the cover part in accordance with the present invention.

Corresponding to FIG. 2, the retaining elements 15 are constructed blade-shaped, as viewed in plan view, in such a manner that a forward end area 18 has a greater distance to the center longitudinal plane A—A than a rearwardly disposed end area 19. Within an area disposed therebetween, the retaining element 15 has a concave configuration.

A particularly advantageous cooling air conduction is achieved in that one retaining element 15 each is arranged on the two sides of the center longitudinal plane A—A, whereby owing to this pairwise arrangement of the retaining elements 15, a channel 20 disposed therebetween is defined which continuously tapers in the direction toward the aggregates and/or drive unit parts to be cooled. The retaining elements 15 are secured according to FIG. 2 by means of detachable fastening elements (bolts, clips, or the like) on the one hand, at the cover part 4 and on the other, at the transmission housing disposed thereabove.

As viewed in side view, the retaining element 15 has approximately the shape of a right angle triangle whose approximately horizontal side is connected with the inner side of the cover part 4 and whose rearwardly disposed upright side extends adjacent the compensating or differential joint 13. The third side rises obliquely upwardly opposite the driving direction.

It is achieved by the shape and the relatively large length dimension of the retaining elements 15 that the cooling air stream sweeps along the transmission housing as long as possible and cools the same. Additionally, a compartmentalization effect toward the wheel casing is realized by the retaining elements 15. Otherwise, the assiduously branched-off cooling air stream would escape without cooling effect on the aggregates directly into the wheel casing because a vacuum prevails thereat.

The inlet opening 16 located directly in front of the retaining element 15, as viewed in the driving direction, has a width which is equal to or smaller than the distance B of the two retaining elements 15 at their forward end areas 18. Owing to the relatively large height extent of the retaining elements 15 and the slight slope of the cover part 4 ahead of the inlet opening 16, the cooling air is effectively guided upwardly and thus also cools adequately this area.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An aerodynamically constructed cover structure for the underside of a motor vehicle, especially of a passenger motor vehicle, comprising cover means provided with at least one inlet opening for the cooling air flowing-through between the cover means and the road surface, and retaining means for fixing the cover means to the underside of the motor vehicle by detachable fastening elements, said retaining means being arranged at the cover means adjacent the inlet opening and so constructed that the cooling air entering through the inlet opening is guided deliberately onto adjoining aggregates and/or drive unit parts by means of the retaining means.

2. A cover structure according to claim 1, wherein the retaining means is constructed blade-shaped, as viewed in plan view.

3. A cover structure according to claim 2, wherein one retaining means each is arranged on the two sides of a center longitudinal plane, a channel disposed therebetween being defined by the two retaining means, and said channel tapering continuously opposite the driving direction.

4. A cover structure according to claim 1, wherein each retaining means is secured, on the one hand, at the cover means, and, on the other, at least at one of body-, engine-, transmission- or drive unit-part extending at a distance to the cover means.

5. A cover structure according to claim 1, wherein the cooling air is conducted by means of the retaining means to a transmission, a differential joint and an axle shaft.

6. A cover structure according to claim 3, wherein the width of the inlet opening is equal to or smaller than the distance between each retaining means in the forwardly disposed end areas thereof.

7. A cover structure according to claim 1, wherein the retaining means--as viewed in side view--have approximately the shape of a right angle triangle.

8. A cover structure according to claim 1, wherein the cover means is positioned adjacent an engine having a protective cover.

9. A cover structure according to claim 1, wherein the cover means rises upwardly under a slight angle of inclination ahead of the inlet opening.

10. A cover structure according to claim 1, wherein one retaining means each is arranged on the two sides of a center longitudinal plane, a channel disposed therebetween being defined by the two retaining means, and said channel tapering continuously opposite the driving direction.

11. A cover structure according to claim 10, wherein each retaining means is secured, on the one hand, at the cover means, and, on the other, at least at one of body-, engine-, transmission- or drive unit-part extending at a distance to the cover means.

12. A cover structure according to claim 10, wherein the width of the inlet opening is equal to or smaller than the distance of the two retaining means in the forwardly disposed end areas thereof.

13. A cover structure according to claim 12, wherein the cover means rises upwardly under a slight angle of inclination ahead of the inlet opening.

14. A cover structure according to claim 13, wherein the retaining means--as viewed in side view--have approximately the shape of a right angle triangle.

15. A cover structure according to claim 11, wherein the cover means is positioned adjacent by an engine having a protective cover.

16. A cover structure according to claim 11, wherein the cooling air is conducted by means of the retaining means to a transmission, a differential joint and an axle shaft.

17. A cover structure according to claim 1, wherein the retaining means is arranged between the cover means and the motor vehicle.

18. A cover structure according to claim 1, wherein the retaining means is positioned rearward of the at least one inlet opening.

* * * * *